P. E. JENKS.
Oil-Well Cup.

No. 214,919. Patented April 29, 1879.

WITNESSES
John A. Lewis
Geo. C. Poulton

INVENTOR
Plympton E. Jenks,
by E. W. Anderson
ATTORNEY

UNITED STATES PATENT OFFICE.

PLYMPTON E. JENKS, OF PETROLIA, PENNSYLVANIA.

IMPROVEMENT IN OIL-WELL CUPS.

Specification forming part of Letters Patent No. 214,919, dated April 29, 1879; application filed October 7, 1878.

*To all whom it may concern:*

Be it known that I, PLYMPTON E. JENKS, of Petrolia city, in the county of Butler and State of Pennsylvania, have invented a new and valuable Improvement in Oil-Well Cups; and I do hereby declare that the following is a full, clear, and exact description of the construction and operation of the same, reference being had to the annexed drawings, making a part of this specification, and to the letters and figures of reference marked thereon.

Figure 1:
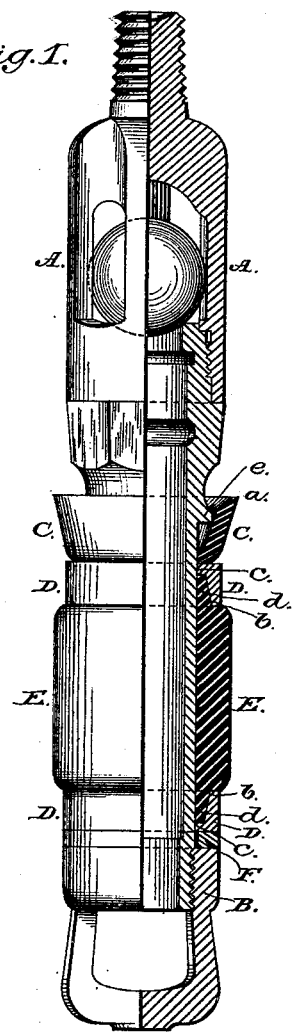
Figure 2:
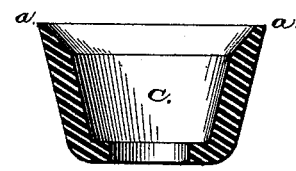

Figure 1 of the drawings is a representation of a side view of my improved oil-well cup, partly in section, and Fig. 2 is a detail.

This invention is designed to provide more durable and effective means for packing the valves of the working-barrels of oil-wells; and it consists in the construction and novel arrangement of the rubber expanding-section and its end rings and the cup-section formed of rubber or of a composition of rubber and canvas, as hereinafter shown and described.

The necessity of a more durable and effective packing to produce the requisite suction for the valves of oil-wells has long been felt. The wearing and cutting effect of the sand is very destructive on the cup-packings generally employed, on account both of their form and of the material of which they are made.

In the accompanying drawings, the letter A designates the brass valve and stem usually employed in the working-barrels of oil-wells. B indicates a burr, which serves to keep the packing in place on the stem.

C represents the cup, of rubber or of a composition of rubber and canvas, which may be used alone or in connection with the expanding packer hereinafter described. If used in connection with the latter it is slipped on the stem next the valve, the concavity being turned toward the valve, as shown in the drawings. Its lip or flange $a$ is designed to extend beyond the margin of the valve, so as to come in close contact with the wall of the barrel. The valve-stem is provided with an annular shoulder, $e$, within the cup C, near its upper margin, serving to hold the latter out to its work.

D D represent the end rings of the expanding packer. These are turned of brass or other suitable metal, and are hollowed out on one side to receive the ends of the packer. The rim $b$ is, therefore, of larger aperture than the neck $c$, which extends inward to fit the stem, so that it will slide thereon easily. The rim-wall is made somewhat tapering on the inside, so that it will compress the packer end inward on the stem.

E represents the packer, a cylindrical or barrel-shaped block of rubber or rubber compound, having a central bore, through which the stem of the valve passes, and in which it fits neatly, but not tightly. This cylindrical packer is provided with ends $d$, which are designed usually to have conical exterior surfaces corresponding with the inwardly-inclined walls of the end rings, D, into which these ends are received, said rings being located one at each end of said packer, as shown in the drawings. The effect of these end rings or holders, when there is an end pressure on the packer, is to keep the ends close to the stem, and thereby force a convex expansion at the large or middle portion of the packer. Sometimes the bore of the working-barrel is larger and necessitates the use of a washer, F, which is slipped on the stem next the lower end ring, after which the burr B is screwed in, to secure all the parts in place. This washer is rendered necessary by the varying size of the working-barrels in use; but the packer will be equally effective without it in barrels of suitable size.

When the washer is in place and the burr set up, the cup will be driven farther up on the stem, and the shoulder $e$ of the latter will therefore expand the margin of the cup to a greater degree.

Sometimes the cup C may be dispensed with. The rings D D are designed to be made nearly of the diameter of the bore of the working-barrel, and the pressure of the oil upon the upper one will keep the packer E expanded under ordinary circumstances. The cup will assist in this respect in large barrels, acting automatically, the pressure of the oil on the cup expanding the packer below it.

The packer E has considerable thickness or body, and when worn exteriorly may be set up by means of the burr, or the washer F may be employed.

The rubber packers are designed to be very durable, as they will not be shrunk and contracted by the salt-water of oil-wells, and will resist the cutting action of the sand in a superior manner. They will, as arranged, be automatically expanded, and their suction is therefore designed to be very nearly perfect at all times until they are completely worn out.

What I claim as new, and desire to secure by Letters Patent, is—

1. The concave packing-cups C, of rubber or canvas and rubber combined, having a free lip or flange, $a$, in combination with the valve-stem having the expanding-shoulder $e$ within the cup near its upper margin or lip, substantially as specified 2. The combination, with the valve-stem B and its burr, of the expanding packer-cylinder E and the concave end rings, D D, inclosing and holding the ends of the packer to the stem, and thereby forcing a central expansion, substantially as specified.

3. The combination, with the valve-stem and its burr, of the expanding packer E, the concave end holding-rings, D, and the washer F, substantially as specified.

In testimony that I claim the above I have hereunto subscribed my name in the presence of two witnesses.

PLYMPTON E. JENKS.

Witnesses:
GEO. H. BEMUS,
W. M. EEMUS.